UNITED STATES PATENT OFFICE.

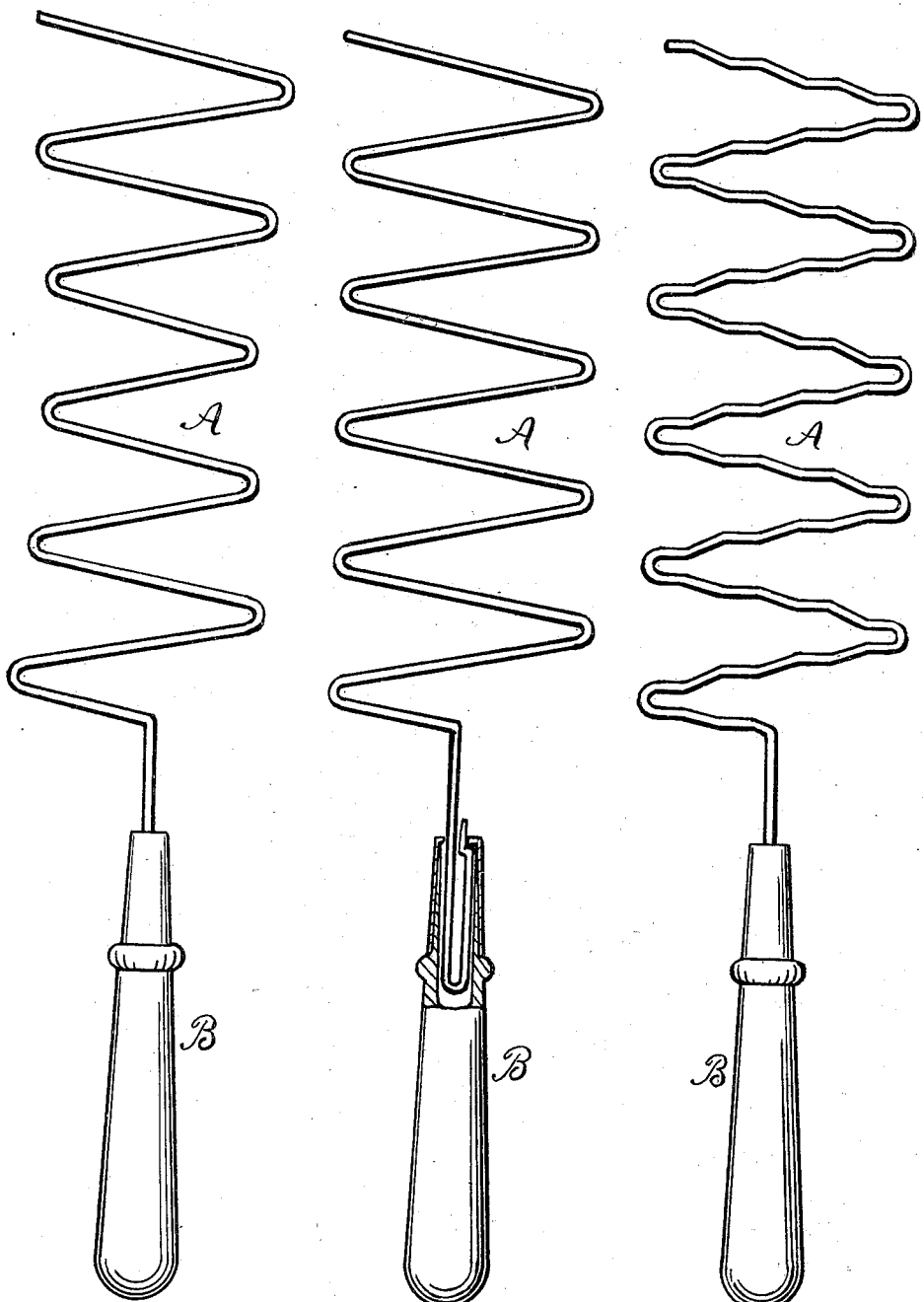

EDWARD R. COOPER AND CHARLES F. THOMPSON, OF LAKEWOOD, OHIO, ASSIGNORS OF ONE-HALF TO LEWIS C. HOPP, OF CLEVELAND, OHIO.

HAIR-DRYING COMB.

SPECIFICATION forming part of Letters Patent No. 655,895, dated August 14, 1900.

Application filed March 19, 1900. Serial No. 9,166. (No model.)

*To all whom it may concern:*

Be it known that we, EDWARD R. COOPER and CHARLES F. THOMPSON, citizens of the United States of America, and residents of Lakewood, in the county of Cuyahoga and State of Ohio, have invented certain new and useful Improvements in Hair-Drying Combs, of which the following is a specification.

This invention relates to a device for drying hair, having for its objects to greatly facilitate the process and to simplify the means for drying the hair of the head after bathing; and the invention consists in providing a metallic comb capable of being heated and passed through the hair, disseminating the heat throughout and quickly evaporating the moisture therefrom.

In the accompanying drawings, Figure 1 is a plan or side elevation of a simple form of the comb. Fig. 2 is a similar view, having the tines corrugated or crimped. Fig. 3 is a comb consisting of a flattened spiral.

A in the several views represents a comb formed of wire of suitable size, bent into zigzag form to constitute tines or teeth susceptible of being passed through the hair. The points of the tines may be on a straight line, as in Fig. 2, or on curved lines, as seen in Fig. 1, and the tines may be crimped or corrugated, as seen in Fig. 2. In Fig. 3 the comb is represented in spiral form and flattened into oval form in cross-section.

B is a handle which may be fixed or removably attached to the comb, as represented in sectional part in Fig. 2.

It is obvious that the comb may be made in a variety of forms, either with straight or inclined tines or teeth to form a double set of teeth, enabling the comb to be passed in and through the hair in two directions, or back and forth, and we do not confine the comb to any specific form; but the forms shown in Figs. 1 and 2 are preferable.

The method of using the comb is first heating it by means of laying on a stove, a lamp, or other suitable means and then passing it through the hair in the usual manner. The heat thus imparted to and disseminated throughout the hair very quickly evaporates or dispels the moisture and the hair is evenly dried throughout, thereby avoiding the slow and tedious method heretofore employed.

Having described our invention, what we claim, and desire to secure by Letters Patent, is—

A hair-drying comb composed of wire bent back and forth upon itself in zigzag form to form a double row of teeth or tines, capable of being heated, and a supporting-handle for said comb, substantially as described.

Signed by us at Cleveland, Ohio, this 17th day of March, 1900.

EDWARD R. COOPER.
CHARLES F. THOMPSON.

Witnesses:
GEO. W. TIBBITTS,
CHARLES L. STOCKER.